March 16, 1965   E. B. CLARK   3,173,227
BUSHING INSERT ASSEMBLY
Filed Aug. 22, 1961
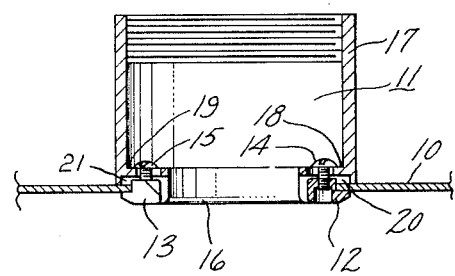
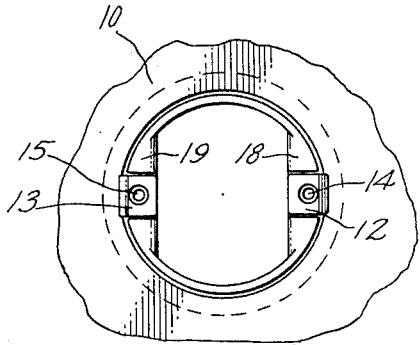
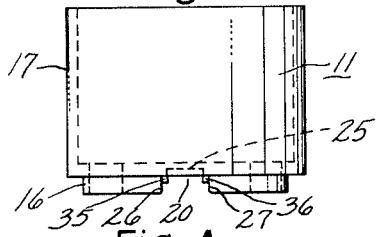
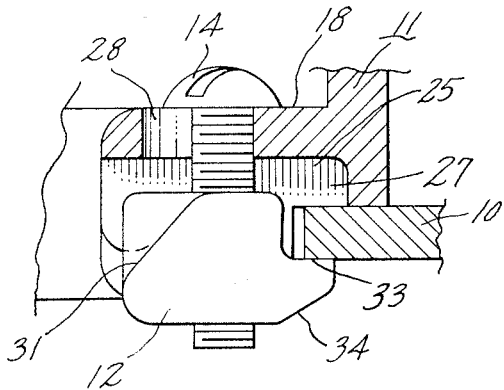
Inventor:
Edward B. Clark
by Allard A. Braddock
His Attorney

United States Patent Office 3,173,227
Patented Mar. 16, 1965

3,173,227
BUSHING INSERT ASSEMBLY
Edward B. Clark, Milford, Conn., assignor, by mesne assignments, to Jones and Laughlin Steel Corporation
Filed Aug. 22, 1961, Ser. No. 133,217
5 Claims. (Cl. 50—127)

This invention relates to a bushing insert assembly which may be partially inserted into an opening in a wall, a floor, or other surface and which may be secured to such surface. The insert assembly is particularly adapted to be secured to a duct of an underfloor wire distribution system in that it is provided with securing or fastening means which may be inserted through an opening in the upper wall of the duct and which may be easily placed in securing position. The insert forms a convenient outlet from the underfloor duct through which electrical connections may be made.

In constructing underfloor raceway or duct networks for electrical wire distribution systems, it is desirable that some form of passage or bushing be provided leading from the top of the duct to the floor level through which the wires may be drawn. Such a duct outlet insert should be easy to install and capable of being firmly attached to the duct.

Accordingly, it is a primary object of the invention to provide an improved bushing insert assembly.

It is a further object of the invention to provide an improved duct outlet insert assembly to be secured to a duct of an underfloor wire distribution system.

Another object of the invention is to provide a duct outlet insert assembly having a unique fastening means by which the assembly may be easily secured to a duct of an underfloor wire distribution system.

Briefly stated, the invention relates to a bushing insert assembly comprising a tubular member having one end of reduced cross-section to be inserted through an opening in a wall, floor, duct, or other surface and means for securing the tubular member to such surface. The end of the tubular member opposite from the reduced portion is larger than the opening so that it abuts one side of the wall or other surface. The reduced end of the tubular member is formed with at least one inwardly extending flange portion having a first and a second end surface, and the second end surface is formed with a recess having an end wall and two side walls. The end wall of the recess is provided with a hole extending from the first end surface of the flange portion into the recess. A fastening means is provided having a threaded portion extending through the hole and having a portion abutting the first end surface of the flange portion. The threaded portion is somewhat smaller in diameter than the dimension of the hole extending towards the adjacent outer wall of the tubular member so that the fastening means is movable in that direction. A securance lug is provided which threadably engages the threaded portion so that upon relative rotation of the fastening means and the lug in one direction, the lug may be moved into the recess. The recess and the lug are formed with mating cam means which cause the lug to move towards the adjacent outer wall of the tubular member as the lug is drawn into the recess so that a lip on the lug engages the adjacent surface or wall surrounding the opening thereby securing the tubular member to the wall.

Further features, objects, and advantages will become apparent with reference to the following drawings in which:

FIG. 1 shows a cross-sectional view of the insert assembly of the invention after installation;

FIG. 2 is an end view of the structure of FIG. 1;

FIG. 3 is an exploded perspective view of the insert assembly of the invention;

FIG. 4 is a cross-sectional view of one of the securing lugs and adjacent structure before the lug has been moved into its securing position;

FIG. 5 shows the structure of FIG. 4 after the lug has been moved into securing position;

FIG. 6 is a side view of the insert assembly of the invention without the securing lugs.

Referring to the drawings, FIG. 1 shows a duct outlet insert assembly installed within an opening in a wall 10. The wall 10 represents any surface through which it may be desirable to install a bushing or tubular insert of the type shown and hereinafter described. It has been found that the insert assembly is particularly suitable for use in connection with an underfloor wire distribution system; and for this application, the wall 10 would represent the top wall of an underfloor duct in the distribution system. It should, of course, be recognized that the insert assembly may be utilized within a vertical wall of a building or other similar structure.

The insert assembly comprises a tubular member 11, commonly referred to as a riser in connection with underfloor wire distribution systems, a pair of securance lugs 12 and 13, and a pair of bolts 14 and 15, or other suitable fastening means for attaching the lugs 12 and 13 to the riser 11 (only lug 12 and bolt 14 are shown by FIG. 1). One end of the riser 11, which is the lower end 16 as seen in the drawings, is of reduced cross-section so that it may be inserted through an opening in the wall 10. The opposite end or upper portion 17 has a diameter which is larger than the opening so that it abuts or rests on the upper surface of duct 10.

The riser 11 is provided with a pair of inwardly extending flange portions 18 and 19, which are shown in FIG. 1 as being relatively thick, thus in effect forming two inwardly thickened wall portions. Each of the flange portions 18 and 19 is provided with a recess 20 and 21 respectively in their lower end surfaces. In FIG. 1, the lug 12 is shown positioned within the recess 20. Referring to FIGS. 4, 5, and 6, it can be seen that the recess 20, which is substantially identical to recess 21, is formed by an end or upper wall 25 and two depending side walls 26 and 27. The recesses are also provided with cam surfaces to be hereinafter described. The top or end wall 25 is provided with a hole or slot 28 which extends from the upper end surface of the flange portion 18 into the recess 20. The shank or threaded portion of bolt 14 extends downwardly through the slot 28, and another portion of the bolt such as the head is larger than at least one dimension of the slot 28 so that the head rests on the surface of the flange portion 18. The shank of the bolt 14 is sufficiently smaller in diameter than the dimension of the slot 28 extending towards the adjacent outer wall of the riser 11 so that the bolt is movable in that direction. The bolt 13 is, of course, similarly situated in the recess 21.

The lugs 12 and 13 may be threadably engaged by the bolts 14 and 15 respectively, and upon relative rotation of the bolts and the lugs in one direction the lugs are drawn into the respective recesses 20 and 21. The lugs are uniquely shaped, as best seen in FIG. 3, so that upon being drawn upwardly by the bolts, they will secure the assembly to the duct surface 10, as will be hereinafter described. Referring to lug 13 in FIG. 3, it can be seen that two corners of the lug have been removed to form two cam surfaces 29 and 30. Similar surfaces 31 and 32 may also be provided on lug 12. Cam surface 31 may be more clearly seen in FIGS. 4 and 5. Each of the lugs is also provided with a lip, shown for example at 33 on lug 12. The lower corner of the lug 34 beneath the lip 33 may be tapered with respect to the remainder of the lug lower surface to facilitate insertion of the assembly into the wall 10.

Each of the recesses 20 and 21 is provided with cam surfaces as seen in FIG. 6 for recess 20 at 35 and 36, which surfaces extend inwardly from the recess walls 26 and 27 and downwardly from the recess top wall 25. The cam surface 36, more clearly seen in FIG. 4, and cam surface 35 are formed to mate with cam surfaces 31 and 32 respectively of lug 12. As lug 12 is drawn upwardly by rotation of bolt 14, the cam surfaces coact to force the lug 12 and the bolt 14 towards the adjacent wall of the riser 11 so that the lip 33 of lug 12 engages the lower surface of the duct wall 10.

Summarizing the installation of the bushing or duct outlet insert assembly, it can be seen that with the lugs in the position shown for lug 12 by FIG. 4 the lower portion 16 of the riser 11 together with the lugs 12 and 13 may be inserted into the opening in the duct wall 10. Since the bolt 14 has not yet been tightened, it may be slid within the hole or slot in the flange 18 towards the axis of the riser 11 and away from the adjacent side wall of the riser. Also, the tapered portion 34 on the lug facilitates insertion of the riser and the lug by urging the lug inwardly as the lug comes into contact with the edge of the opening and the duct wall 10. After insertion, the bolts may be tightened to draw the lugs upwardly into the recesses. It should be noted that the side walls of the recesses prevent rotation of the lugs. Continued tightening of the bolts brings the cam surfaces of the recesses and the cam surfaces on the lugs into engagement causing the screws and the lugs to be moved outwardly and the lugs upwardly so that the lips on the lugs engage the lower surface of the duct wall 10 to thereby secure the insert assembly to the duct.

It will be obvious to those skilled in the art that various changes and modifications may be made without departing from the invention in its broader aspects. For example, the number of lugs utilized and the spacing of the lugs around the lower edge of the riser is not critical. Likewise, the configurations of the cam surfaces on the lugs and the riser may be varied as desired, and further it is not absolutely essential that recesses be provided in the lower edge of the riser inasmuch as the mating cam surfaces are the critical feature. Accordingly, it is intended in the appended claims to cover all such changes and modifications as fall within the true spirit and scope of the invention.

What I claim as new and desire to secure by Letters Patent of the United States is:

1. A bushing insert assembly comprising: a tubular member having one end of reduced cross-section to be inserted through an opening in a wall, the opposite end of said member being larger than the opening so that it abuts one side of said wall, said member being formed with at least one inwardly extending flange portion having a first and a second end surface, said second end surface being formed with a recess having an end wall and two side walls, said end wall being provided with a hole extending from the first end surface of said flange portion into said recess, a fastening means having a threaded portion extending through said hole and having a portion abutting the first end surface of said flange portion, said threaded portion being somewhat smaller in diameter than the dimension of the hole extending towards the adjacent outer wall of said tubular member so that said fastening means is movable in that direction, a securance lug threadably engaging the threaded portion of said fastening means to be movable into said recess upon relative rotation of said fastening means and said lug in one direction, said lug having a lip for engaging the opposite side of said wall, and said recess and said lug being formed with mating cam means which cause the lug to be moved toward the adjacent outer wall of the tubular member as the lug is moved into the recess so that the lip engages the adjacent surface of the wall thereby securing the tubular member to the wall.

2. A duct outlet insert assembly to be secured to a duct of an underfloor wire distribtuion system comprising: a riser having a lower portion of reduced cross-section to be inserted through an opening in the upper wall of said duct, the upper portion of said riser being larger than the opening so that it rests on the upper surface of said duct, said riser being formed with at least one inwardly extending flange portion, said flange portion being formed with a recess having a top wall and two depending side walls, said top wall having a hole extending from the upper surface of said flange portion into said recess, a fastening means having a threaded portion extending downwardly through said hole and having a portion resting on the upper surface of said flange portion, said threaded portion being somewhat smaller in diameter than the dimension of the hole extending towards the adjacent outer wall of said tubular member so that said fastening means is movable in that direction, a securance lug threadably engaging the threaded portion of said fastening means to be movable into said recess upon relative rotation of said fastening means and said lug in one direction, said lug having a lip for engaging the lower surface of the upper wall of said underfloor duct, said recess and said lug being formed with mating cam means which cause the lug to be moved towards the adjacent outer wall of the riser as the lug is moved upwardly so that the lip engages the lower surface of the upper wall of the underfloor duct thereby securing the riser to the duct.

3. The assembly of claim 2 in which the lower surface of the lip on said lug is tapered with respect to the remainder of the lug lower surface to facilitate insertion of the insert assembly.

4. A duct outlet insert assembly to be secured to a duct of an underfloor wire distribution system comprising: a riser having a lower portion to be inserted through an opening in the upper wall of said duct, the upper portion of said riser being larger than the opening so that it rests on the upper surface of said duct, said riser being formed with at least one inwardly thickened wall portion, said thickened portion formed with a recess having a top wall and two depending side walls, said top wall having a slot extending from the upper surface of said thickened portion into said recess, a fastening means having a threaded portion extending downwardly through said slot and having a portion resting on the upper surface of said flange portion, said threaded portion being somewhat smaller in diameter than the dimension of the slot extending towards the adjacent outer wall of said tubular member so that said fastening means is movable in that direction, a securance lug threadably engaging the threaded portion of said fastening means to be movable into said recess upon relative rotation of said fastening means and said lug in one direction, said lug having a lip for engaging the lower surface of the upper wall of said underfloor duct, said recess and said lug being formed with mating cam means which cause the lug to be moved towards the adjacent outer wall of the riser as the lug is moved upwardly so that the lip engages the lower surface of the upper wall of the underfloor duct thereby securing the riser to the duct.

5. A duct outlet insert assembly to be secured to a duct of an underfloor wire distribution system comprising: a tubular riser having a lower portion of reduced cross-section to be inserted through an opening in the upper wall of said duct, the upper portion of said riser being larger than the opening so that it rests on the upper surface of said duct, said riser being formed with a pair of inwardly extending flange portions, each of said portions being formed with a recess having a top wall and two depending side walls, said top wall having a hole extending from the upper surface of said flange portion into said recess, a fastening means having a threaded portion extending downwardly through said hole and having a portion resting on the upper surface of said flange portion, said threaded portion being somewhat smaller in diameter than the dimension of the hole extending towards the adjacent outer wall of said tubular member so that said fastening means is movable in that direction, a securance lug threadably engaging the threaded portion of said fastening means to be movable into said recess upon relative rotation of said fastening means and said lug in one direction, said lug having a lip for engaging the lower surface of the upper wall of said underfloor duct, said recess and said lug being formed with mating cam means which cause the lug to be moved towards the adjacent outer wall of the riser as the lug is moved upwardly so that the lip engages the lower surface of the upper wall of the underfloor duct thereby securing the riser to the duct.

References Cited in the file of this patent
UNITED STATES PATENTS

| | | |
|---|---|---|
| 701,354 | Kerr | June 3, 1902 |
| 2,242,503 | Baule | May 20, 1941 |
| 2,916,540 | Rostan | Dec. 8, 1959 |
| 3,006,230 | McCauley | Oct. 31, 1961 |
| 3,046,516 | Tymkewicz | July 24, 1962 |